United States Patent [19]

Hasegawa et al.

[11] Patent Number: 4,730,292
[45] Date of Patent: Mar. 8, 1988

[54] DEVICE FOR SEQUENTIALLY FEEDING A PLURALITY OF DISK-SHAPED RECORDING MEDIA

[75] Inventors: Kazuo Hasegawa; Osamu Fujiwara, both of Kyoto, Japan

[73] Assignee: Mitsubishi Denki Kabushiki Kaisha, Tokyo, Japan

[21] Appl. No.: 762,400

[22] Filed: Aug. 5, 1985

[30] Foreign Application Priority Data

Aug. 7, 1984 [JP] Japan ................... 59-165408

[51] Int. Cl.$^4$ .................. G11B 17/22; G11B 19/10; G11B 33/04
[52] U.S. Cl. ................................ 369/39; 369/36
[58] Field of Search .................. 369/39, 38, 37, 36

[56] References Cited

U.S. PATENT DOCUMENTS

| 1,595,241 | 8/1926 | Nelson | 369/39 |
| 2,178,886 | 11/1939 | Cloer | 369/39 |
| 2,214,913 | 9/1940 | Vischet | 369/39 |
| 2,463,050 | 3/1949 | Pasternack | 369/39 |
| 2,521,046 | 9/1950 | Darwin | 369/39 |
| 2,719,720 | 10/1955 | Rockola | 369/39 |
| 2,725,235 | 11/1955 | Hull et al. | 369/39 |

FOREIGN PATENT DOCUMENTS 64671 11/1982 European Pat. Off. .
2102184 1/1983 United Kingdom .

OTHER PUBLICATIONS

Japanese Patent Abstracts, vol. 6, No. 252, 12/82.

*Primary Examiner*—Steven L. Stephan
*Attorney, Agent, or Firm*—Staas & Halsey

[57] ABSTRACT

A device for sequentially feeding a plurality of disk-shaped recording media in an apparatus for performing a data recording or reproducing operation on a rotating disk-shaped recording medium. The device includes loading members, each of which holds one disk-shaped recording medium and each of which is rotatable about a common axis. A swinging mechanism swings a selected one of the loading members about the common axis through a predetermined angle to a feeding position. A lifting apparatus lifts the disk-shaped recording medium selected by the selected one of the loading members into a position at which the data recording or reproducing operation can be performed. A microprocessor controls the operation of the swinging mechanism and the lifting apparatus. In this manner, a plurality of disk-shaped recording media can be sequentially subjected to a data recording or reproducing operation without the intervention of an operator. Further, the disk-shaped recording media can be individually selected for the data recording or reproducing operation in any desired order. The device is particularly suitable for use with a compact disk player, for allowing a plurality of compact disks to be sequentially fed for the data reproducing operation in any desired order.

13 Claims, 15 Drawing Figures

DEVICE FOR SEQUENTIALLY FEEDING A PLURALITY OF DISK-SHAPED RECORDING MEDIA

BACKGROUND OF THE INVENTION

This invention relates to a disk-shaped recording medium feeding device for feeding a plurality of disk-shaped recording media, so that a sequential recording or reproducing operation can be performed thereon.

An example of a conventional disk-shaped recording medium is an audio compact disk. However, prior art compact disk apparatus are incapable of performing a sequential recording or reproducing operation for a plurality of conventional audio compact disks. Thus, there is a requirement that an operator be available to change disks once a recording or reproducing operation has been completed for a single disk. Therefore, there is a need in the art for a sequential feed device for disk-shaped recording media.

SUMMARY OF THE INVENTION

It is an object of the present invention to eliminate the above-described difficulty in performing the recording or reproducing operations for disk-shaped recording media in accordance with the prior art.

More specifically, it is an object of this invention to provide a disk-shaped recording medium feeding device for automatically feeding a plurality of disk-shaped recording media so that a sequential recording or reproducing operation can be performed thereon.

The device of the present invention is employed in an apparatus for recording or reproducing data on a rotating disk-shaped recording medium, and includes: a plurality of loading members which are rotatable about a common axis, each of the loading members being capable of holding one disk-shaped recording medium; a swinging mechanism for swinging a selected one of the loading members through a predetermined angle to a feeding position; and lifting means for lifting the disk-shaped recording medium held by the selected one of the loading means, above the selected loading member, so that it is available for the recording or reproducing operation. The swinging mechanism positions the selected one of the loading members substantially above the lifting means, so that the lifting means can lift the selected disk-shaped recording means above the lifting means. A microprocessor controls the operation of the swinging mechanism and the lifting means, so that the disk-shaped recording media are sequentially positioned for the data reproducing or recording operation.

The device of the present invention is capable of sequentially feeding each of a plurality of disks into position for a recording or reproducing operation, one by one, thereby overcoming the need for having an operator present to manually replace the disk-shaped recording medium each time a new disk-shaped recording medium is to be subjected to a recording or reproducing operation.

These together with other objects and advantages will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a sectional view, similar to FIG. 2, in which a disk 30 is positioned on the disk loading member 2a;

DESCRIPTION OF THE PREFERRED EMBODIMENTS

Figure 1:
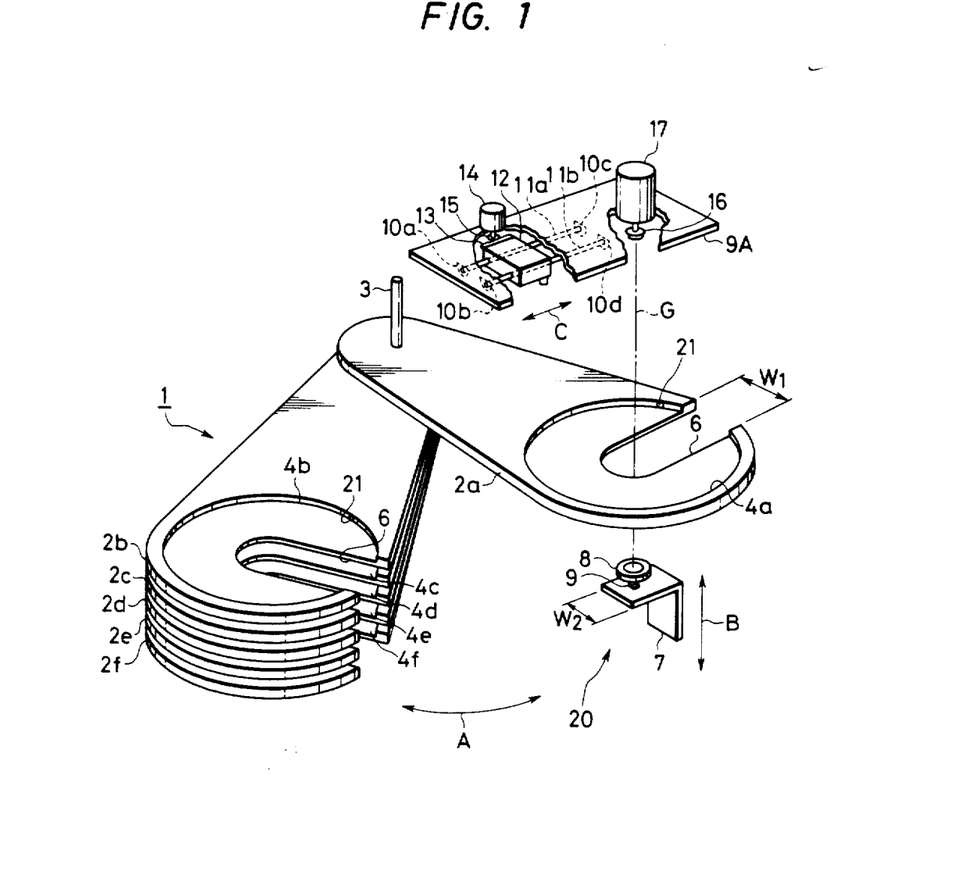
FIG. 1 is a perspective view of a portion of a compact disk player having a device for sequentially feeding a plurality of disk-shaped recording media in accordance with the present invention.
Figure 2:
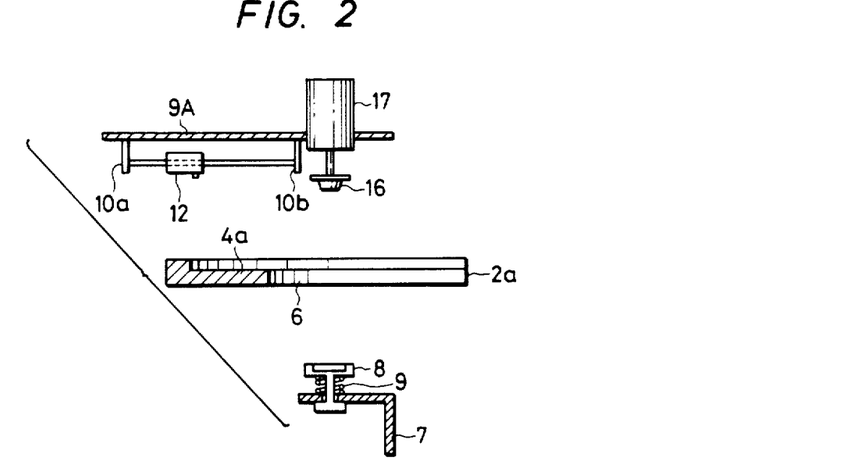
FIG. 2 is a sectional view of the arrangement of the disk loading member 2a of FIG. 1 with respect to the turntable 16 and the disk lifter 7.

An embodiment of the invention will be described with reference to FIGS. 1-12 of the accompanying drawings. FIGS. 1 and 2 show a compact disk player for disk-shaped recording media, namely, audio compact disks (hereinafter referred to as "disks"). A disk loading means 1 includes a plurality of disk loading members or swing plates 2a through 2f, which are mounted on a common support shaft 3 in such a manner that the swing plates 2a through 2f can be rotated in the directions of arrow A by feeding means comprising a plate rotating mechanism or swinging mechanism (described below), one at a time. The swing plates 2a through 2f have recesses 4a through 4f, respectively, which are adapted to receive disks. A photoelectric switch 21 is provided in each of the recesses 4a through 4f to detect the presence or absence of a disk. Each of the swing plates 2a through 2f has a U-shaped notch 6 which extends from the periphery to the center of the recess in the respective swing plate. The width $W_1$ of the U-shaped notch 6 is larger than the width $W_2$ of a lifter 7 in a disk lifting means 20. The disk lifting means 20 includes a lifter 7, a clamp 8, a spring 9, and a driving mechanism (described below). The clamp 8 is coupled to the lifter 7 in such a manner that it is slidable in the directions of the arrow B. The clamp 8 is urged upwardly by the spring 9 and can be moved up and down with the lifter 7 (in the directions of the arrow B) by the driving mechanism. When the lifter 7 is moved upwardly, the clamp 8 aligns with a turntable 16 as indicated by the one-dot chain line G in FIG. 1, and when one of the swing plates 2a through 2f is rotated into a feeding position, the center of the corresponding one of the recesses 4a through 4f aligns with the one-dot chain line G. Thus, the maximum swinging range of each of the swing plates 2a through 2f is to the one-dot chain line G. FIG. 1 shows the first swing plate 2a after it has been swung to the feeding position at the one-dot chain line G.

Referring still to FIGS. 1 and 2, a plate 9A is fixedly secured to the disk player body (not shown) and guide holders 10a through 10d are mounted on the plate 9A. The guide holders 10a and 10c hold a guide rod 11a, and the guide holders 10b and 10d hold a guide rod 11b. An optical pickup 12 is slidably mounted on the guide rods 11a and 11b, and is adapted to apply a laser beam to a disk and to convert light reflected from the disk into electrical signals. A rack 13 is provided on one end of the optical pickup 12 and is engaged with a pinion 15 which is coupled to a feed motor 14, so that the optical pickup 12 is moved in the directions of the arrow C by the feed motor 14. The aforementioned turntable 16 engages the central hole of the disk, to hold the latter in cooperation with the clamp 8 (see FIG. 6). The turntable 16 is rotated by a disk motor 17.

Figure 3:
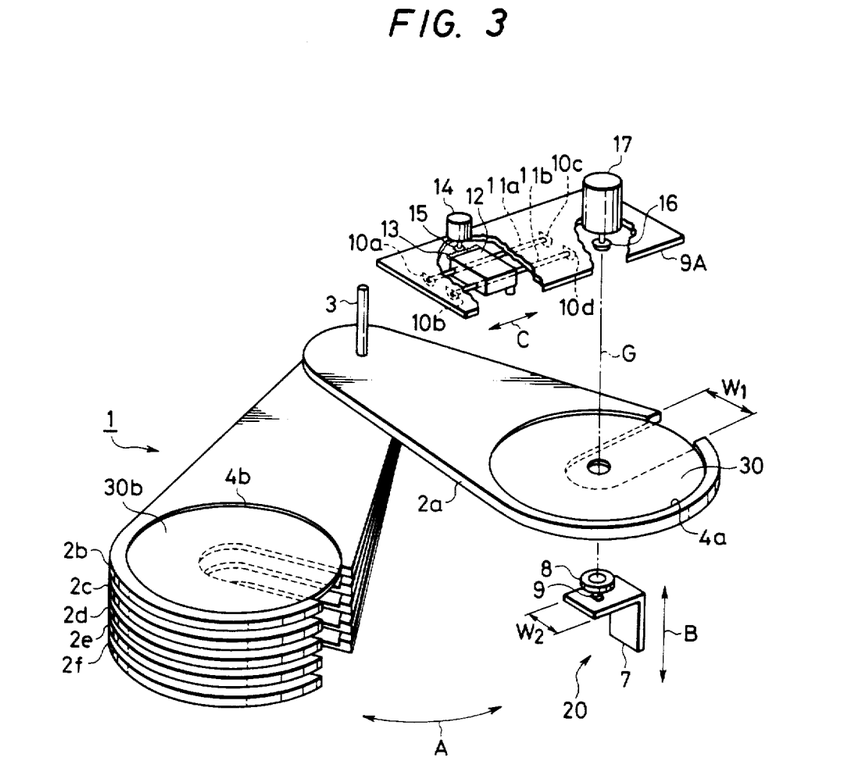
FIG. 3 is a perspective view, similar to FIG. 1, in which disks 30 are loaded in the disk loading members.
Figure 4:
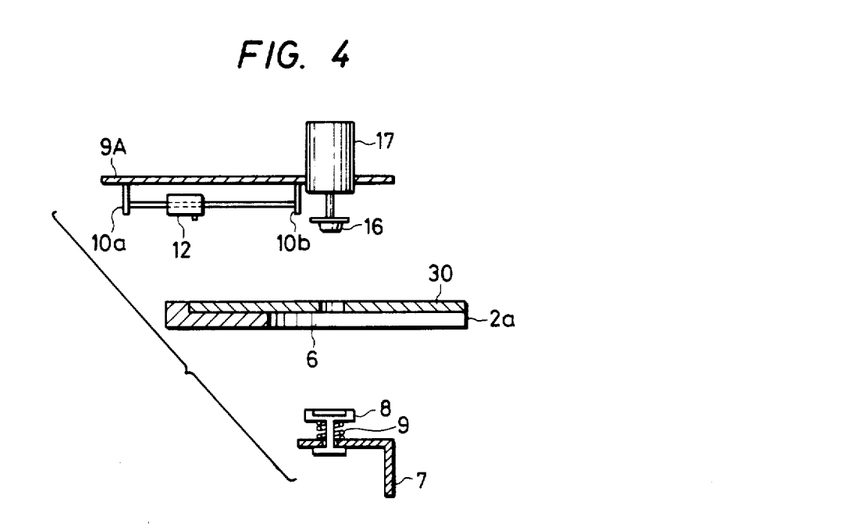
Figure 5:
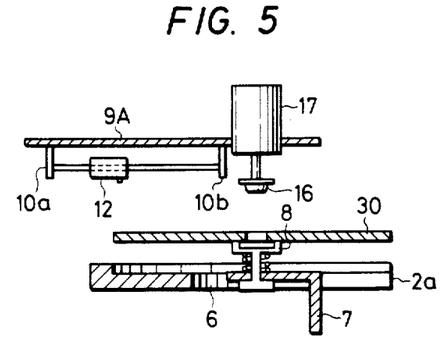
FIGS. 5-6 are sectional views, similar to FIG. 4, for describing the positioning of a disk 30 for a recording or reproducing operation.
Figure 6:
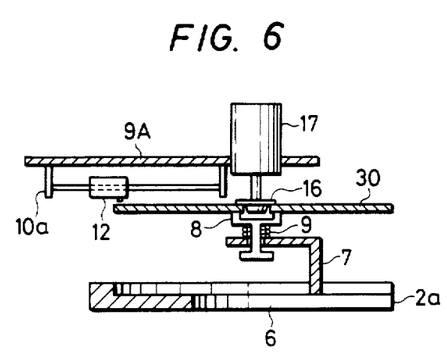
Figure 7:
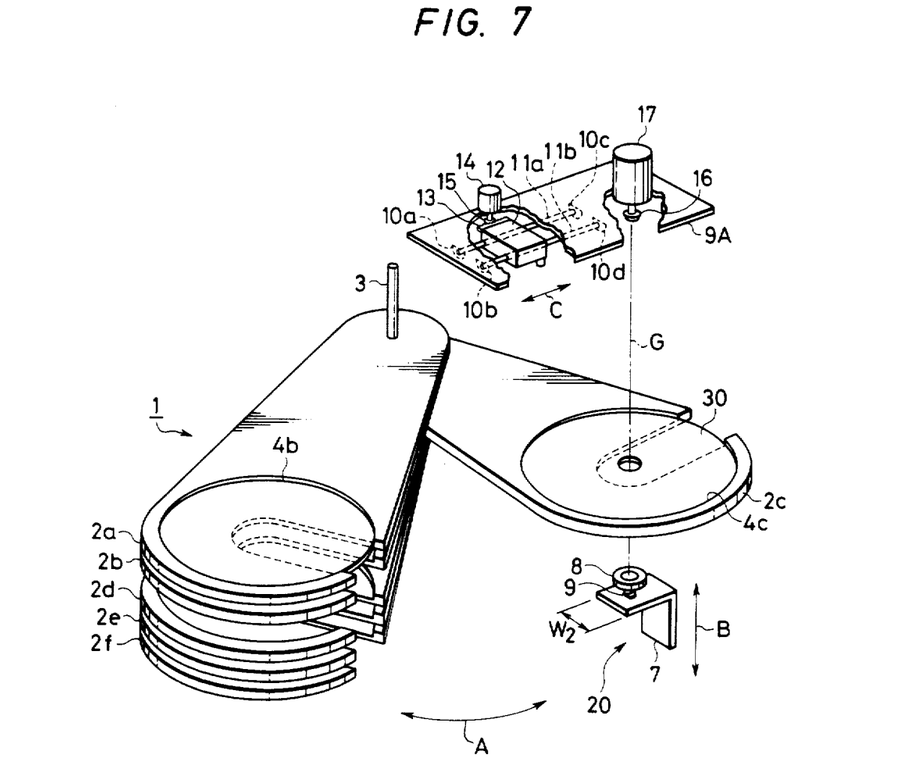
FIG. 7 is a perspective view, similar to FIG. 3, in which a new disk 30, carried by a loading member 2c, has been swung into position to be lifted for a recording or reproducing operation.

The operation of the sequential feeding device thus constructed will be described. First, disks 30 are placed in the recesses 4a through 4f of the swing plates 2a through 2f, respectively, with the signal surfaces facing up, as shown in FIGS. 3 and 4. When a signal reproducing operation is to be performed using a disk 30, a swing plate (e.g., swing plate 2a) is rotated from a stored position to the feeding position (FIG. 3). The lifter 7 is moved upwardly so as to lift the disk 30 as shown in FIG. 5. When the disk 30 abuts and engages the turntable 16, the spring 9 is compressed. With the aid of the spring force, the disk 30 is held between the clamp 8 and the turntable 16 (FIG. 6). Under this condition, the disk motor 17 is driven to rotate the disk 30, and the optical pickup 12 reproduces the signals on the disk 30 while being moved in the directions of the arrow C by the feed motor 14. After the signal reproducing operation is completed for a disk 30, the lifter 7 together with the disk 30 is moved downwardly so as to be restored to the position shown in FIGS. 3 and 4. Next, the signal reproducing operation for another disk 30 which is for instance held by the swing plate 2c, is caused to be performed. The swing plate 2a is returned to the stored position, and then the swing plate 2c is rotated to the feeding position as shown in FIG. 7. The disk 30 on the swing plate 2c is then lifted into the operating position for the signal reproducing operation, as described above with respect to FIGS. 3-6.

As is apparent from the above description, a disk player including the sequential feed device of the present invention, is designed so that a desired one of the swing plates 2a through 2f can be swung into the feeding position for signal reproduction of the disk 30 on the selected one of the swing plates 2a through 2f. Thus, the term "sequential feed" means that plural disks 30 can be consecutively fed for a data recording or reproducing operation, and does not require that the disks 30 be fed in any particular order. That is, in the disk player, any one of the swing plates 2a through 2f can be selected, and therefore a plurality of disks can be subjected to signal reproduction, one after another, in any desired order.

When there is only one disk 30 to be subjected to a reproducing operation, a compact disk player having the sequential feed device of the present invention operates in the same manner as a conventional compact disk player. That is, in this case, it is not necessary to place the disk in the recess of one of the swing plates 2a through 2f. If disk detecting means, such as the photoelectric switch 21, is provided for each of the recesses 4a through 4f, in order to detect the presence or absence of a disk in the recess, then the detection signal can be utilized for controlling the operation of the swing plate swinging mechanism (described below) or as a warning signal to an operator.

Figure 8:
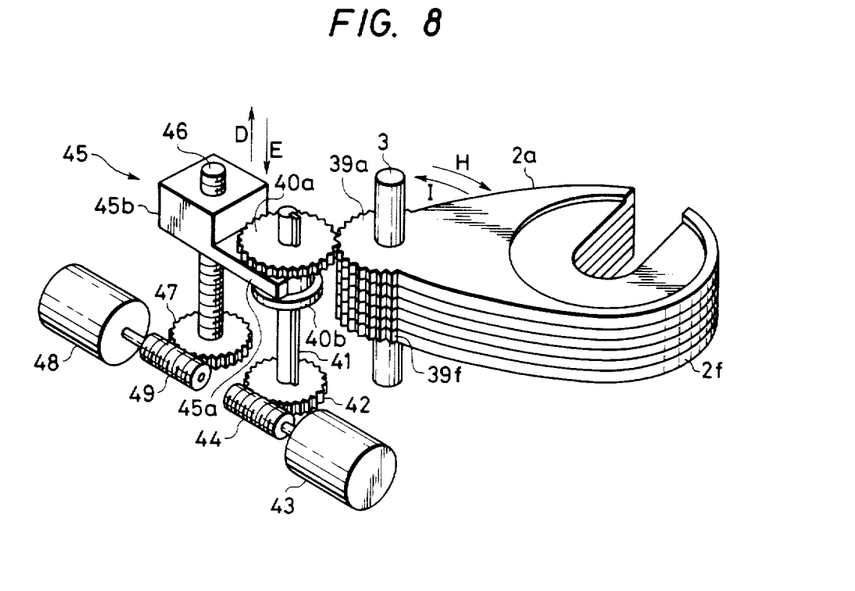
FIG. 8 is a perspective view of a portion of the swinging mechanism for rotating a selected one of the swing plates 2a through 2f into a feeding position.

FIG. 8 is a perspective view illustrating the swinging mechanism for swinging a selected one of the swing plates 2a through 2f from the stored position into the feeding position. Gears 39a through 39f are formed coaxially with the common support shaft 3 at one end of the respective swing plates 2a through 2f. A gear 40a engages one of the gears 39a through 39f of the swing plates 2a through 2f and is slideably supported on a shaft 41. A collar 40b is formed integrally with the gear 40a on the shaft 41 and is disposed in parallel with the gear 40a, so that a gap is formed therebetween. A gear 42 is fixedly mounted on the shaft 41 and a worm gear 44 engages the gear 42. The worm gear 44 is fixedly mounted on the shaft of an electric motor 43 which is used to rotate the worm gear 44. A support member 45 includes a U-shaped lever 45a, which is fitted into the gap between the gear 40a and the collar 40b, and a nut 45b which extends from the lever 45a and engages a screw 46. A gear 47 is fixedly mounted on the screw 46 and engages a worm gear 49. The worm gear 49 is fixedly mounted on the shaft of an electric motor 48 for rotation under the control of the motor 48.

In operation, when a particular one of the swing plates 2a through 2f is to be rotated into the feeding position, the motor 48 is rotated, thereby rotating the worm gear 49, the gear 47, and the screw 46. As a result, the nut 45b is moved in the direction of arrow D or arrow E. Since the leyer 45a is formed integrally with the nut 45b and is fitted into the gap between the collar 40b and the gear 40a, the gear 40a moves along the shaft 41 together with the nut 45b. Thus, the gear 40a is moved to engage a selected one of the gears 39a through 39f of the corresponding swing plates 2a through 2f, in dependence upon the extent of rotation of the motor 48. After the selected one of the gears 39a through 39f is engaged by the gear 40a, the motor 48 stops rotating and the motor 43 is rotated, thereby rotating the worm gear 44, the gear 42, and the shaft 41. This cause the gear 40a to rotate, which in turn causes the selected one of the gears 39a through 39f (corresponding to one of the swing plates 2a through 2f) which is engaged with the gear 40a to rotate about the common support shaft 3 in the direction of arrow I. The motor 43 is rotated until the selected one of the swing plates 2a through 2f is rotated into the feeding position.

Figure 9A:
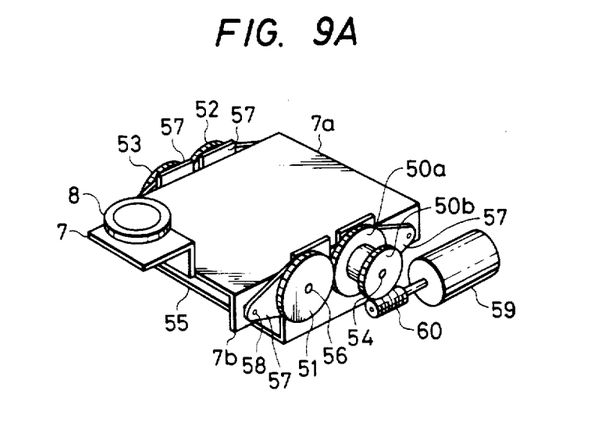
FIGS. 9A and 9B are a perspective view and a side view, respectively, of a disk lifting means 20 including a driving mechanism.
Figure 9B:
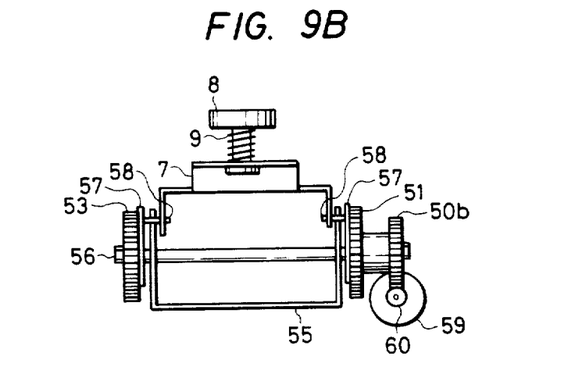

The driving mechanism for driving the lifting means 20 will be described with reference to FIGS. 9A and 9B. A plate 7a is formed integrally with the lifter 7. The plate 7a is bent at right angles at opposite ends and four slots 7b are formed at the corners of the bent end portions, respectively. Four gears 50a, 51, 52 and 53 having equal diameter are provided. The gears 50a and 52 are fixedly mounted on a shaft 54 which is supported on a base 55, while the gears 51 and 53 are rotatably mounted on a shaft 56 which is fixedly mounted on the base 55. The gear 50a engages the gear 51, while the gear 52 engages the gear 53. Each of the gears 50a, 51, 52 and 53 has mounted thereon a plate 57 to which a shaft 58 is fixed. The shafts 58 are fitted into the four slots 7b of the plate 7a, respectively. A gear 50b is formed integrally with the gear 50a, and a worm gear 60 engages the gear 50b. The shaft of an electric motor 59 is fixed to the worm gear 60 for driving the worm gear.

When the lifting means is to lift one of the disks 30 into the operating position for a recording or reproducing operation, the motor 59 is rotated, thereby rotating the worm gear 60, the gears 50b and 50a, the shaft 54, and the gear 52. The shafts 58 which are fixed to the gears 50a and 52 by the plates 57, are also rotated about the shaft 54 as the gears 50a and 52 rotate. The gears 51 and 53 are rotated by the gears 50a and 52, respectively, and the shafts 58 which are fixed to the gears 51 and 53 via the plates 57, are also rotated about the shaft 56 as the gears 51 and 53 rotate. Since the shafts 58 are fitted in the slots 7b of the plate 7a, the plate 7a is caused to move vertically as the shafts 58 are rotated about the shafts 54 and 56. Since the gears 50a, 51, 52 and 53 are of equal diameter, the lifter 7 which is formed integrally with the plate 7a, is moved vertically and in parallel in response to the rotation of the motor 59.

Figure 10:
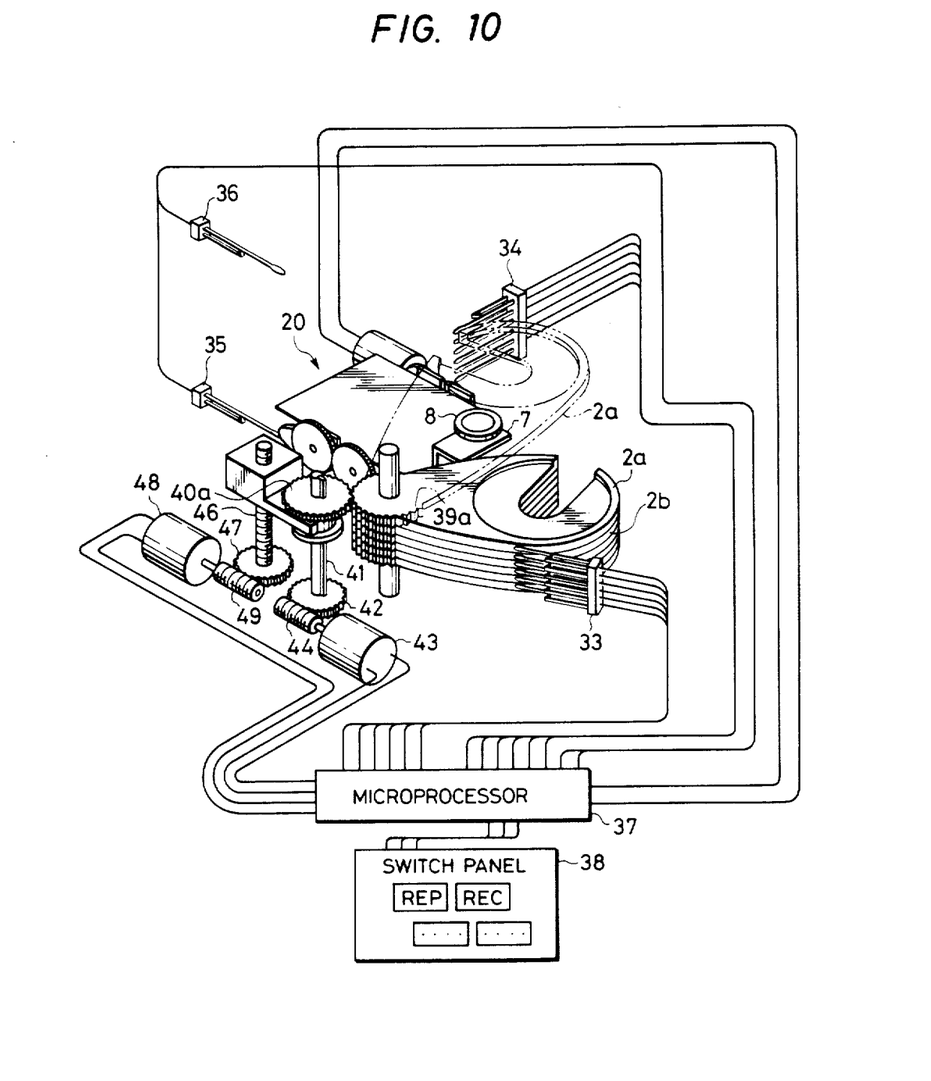
FIG. 10 is a perspective view of the device in accordance with the present invention and its connection to control circuitry for controlling the operation of the swinging mechanism and the disk lifting means 20.

FIG. 10 is a perspective view of the sequential feeding device of the present invention and its connection to circuitry for controlling the operation of the swinging mechanism and the lifting means 20, and for positioning the selected one of the swing plates 2a through 2f in a position for a recording or reproducing operation. Switches 33 and 34 are positioned to detect whether each of the swing plates 2a through 2f is in the stored position or the feed position. Switches 35 and 36 detect the upward and downward terminations of the lifting means 20. A microprocessor 37 is connected to the switches 33, 34, 35 and 36 and to the motors 43, 48 and 59. A switch panel 37 may be actuated by an operator to select the reproducing or recording mode of operation. The microprocessor 37 receives detection signals from the switches 33, 34, 35 and 36, as well as the mode selection signal from the switch panel 38, and controls the actuation of the motors 43, 48 and 59, accordingly.

Figure 11A:
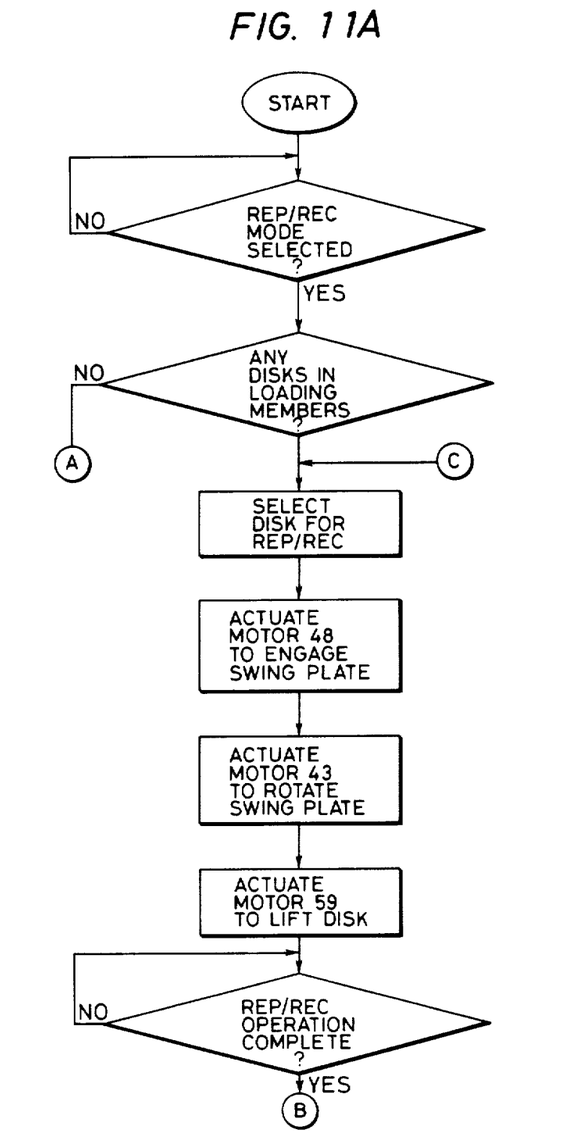
FIGS. 11A and 11B are a flowchart for describing the operation of the microprocessor 37 in FIG. 10.
Figure 11B:
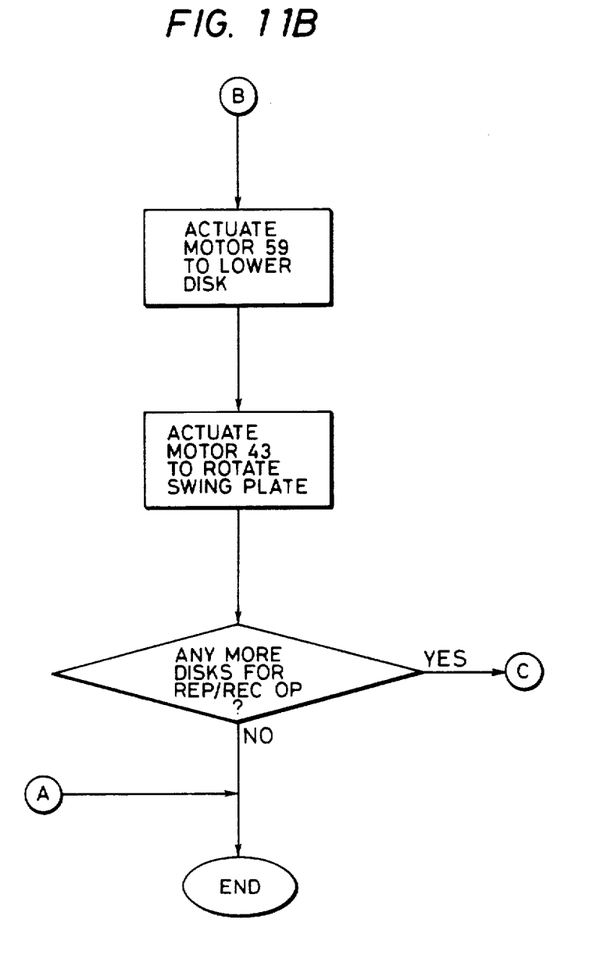

The operation of the swinging mechanism and the lifting means 20 under the control of the microprocessor 37 will be described with reference to FIG. 10 and FIGS. 11A-11B which form a flowchart for the processing performed by the microprocessor 37. In operation, the microprocessor 37 determines whether any disks 30 are held by the loading members 2a through 2f after the reproducing or recording mode is selected by an operator via a switch on the switch panel 38. Next, the microprocesor 37 determines the appropriate disk 30 to be selected for the desired reproducing or recording mode. Assuming that the gear 40a moves by the thickness of one swing plate for each revolution of the motor 48, the microprocessor 37 actuates the motor 48 to rotate by the required number of revolutions in order to move the gear 40a to engage with the gear of the selected swing plate (e.g., gear 39a of swing plate 2a). Then, the motor 43 is actuated to rotate the swing plate 2a into the feeding position where it is stopped based on a detection signal from the switch 34. Next, the motor 59 is actuated to raise the lifter 7 (and thus the disk 30) to its upward terminaton position where it is stopped based on a detection signal from the switch 36. Thereafter, the recording or reproducing operation is performed.

After the recording or reproducing operation has been completed, the microprocessor 37 actuates the motor 59 so that the disk 30 is lowered by the lifter 7 until the switch 35 is acutated. Then, the microprocesor 37 actuates the motor 43 so that the disk 30 on the swing plate 2a is rotated into the stored position. Therafter, the microprocessor 37 operates to control the motors 43, 48 and 59 to bring the next selected swing plate (e.g., swing plate 2b) into position for the recording or reproducing operation. Thus, the microprocessor 37 operates to control the motors 43, 48 and 59 to provide the desired series of disks 30 for the recording or reproducing operation. While the above-describe example illustrates a situation in which the disks 30 on the swing plates 2a through 2f are consecutively subjected to a recording or reproducing operation, the switch panel 38 could include switches for directing any desired order of selection for the swing plates 2a through 2f. In addition, the detector 21 in each swing plate can be used for providing a signal to the microprocessor 37 so that the microprocessor 37 will not actuate the motor 48 so as to position the gear 40a adjacent a swing plate which is not holding a disk 30.

Figure 12:
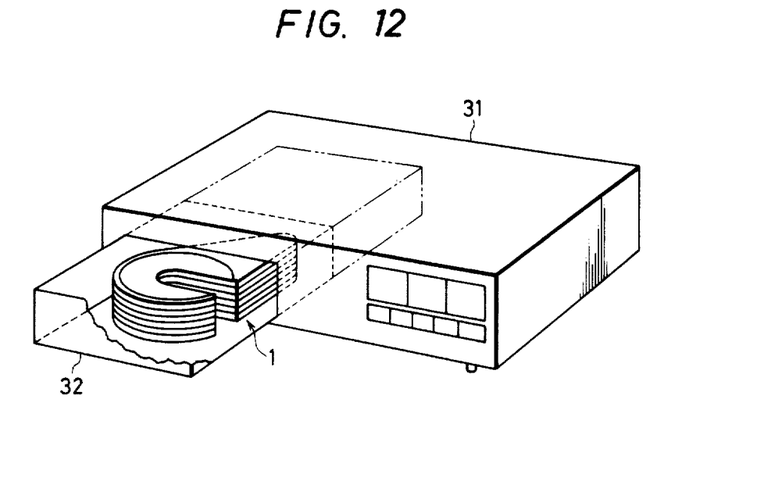
FIG. 12 is an external perspective view, partially in phantom, of a compact disk player incorporating the sequential feed device of the present invention.

FIG. 12 is an external view of a compact disk player 31 including the sequential feed device of the present invention. A table unit 32 of the compact disk player 31 can be pulled out from the front, to position the disks 30. The compact disk player 31 may be so designed that after the table unit 32 is completely pulled out of the player body, the disks may be set therein or removed therefrom, or one of a plurality of table units 32 for holding disks may be selectively inserted in the compact disk player 31.

Figure 13:
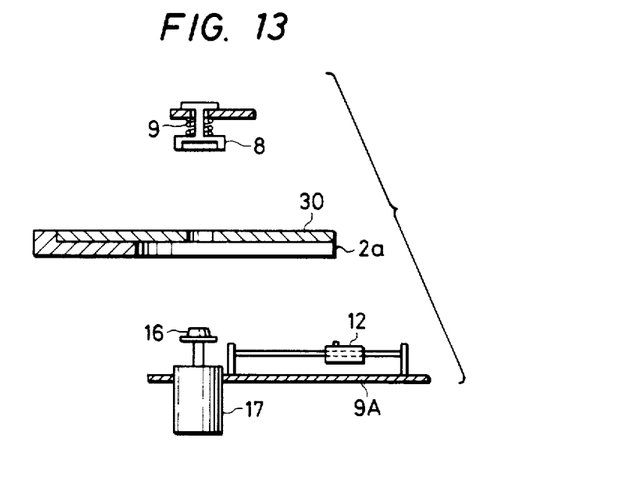
FIG. 13 is a sectional view, similar to FIG. 4, of an alternate embodiment of a compact disk player including the sequential feed device of the present invention.

In the above-described embodiment, six swing plates 2a through 2f are employed. However, it goes without saying that the compact disk player may be so designed as to employ any number of swing plates. Furthermore, the compact disk player described above may be modified so that, as shown in FIG. 13, the clamp 8 is held above the disk 30, and the disk motor 17 and the optical pickup 12 are lifted vertically to move the disk 30 upwardly. In this modification, the signal surface of the disk should be positioned facing downwardly.

In the above-described embodiments, the sequential feed device of the present invention is shown used with audio compact disks. However, the sequential feed device of the invention can also be used in disk players for other disk-shaped recording media, such as photomagnetic disks and optical video disks.

As is apparent from the above description, the sequential feed device according to the present invention comprises a plurality of disk-shaped recording medium loading members, a mechanism for swinging the plurality of disk-shaped recording medium loading members through a predetermined angle, and a means for lifting any one of the disks placed on any one of the loading members. Therefore, the present invention allows a plurality of disk-shaped recording media to be subjected to a recording or reproducing operation sequentially.

The many features and advantages of the invention are apparent from the detailed specification and thus it is intended by the appended claims to cover all such features and advantages of the system which fall within the true spirit and scope of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A device for sequentially feeding a plurality of disk-shaped recording media in an apparatus for performing a data recording or reproducing operation on a rotating disk-shaped recording medium, comprising:
   loading means for holding a plurality of disk-shaped recording media, said loading means being insertable into and removable from apparatus including a plurality of loading members rotatable about a common axis, each of said loading members being capable of holding one of the disk-shaped recording media, each of said loading members having a geared portion extending therefrom, said geared portions of said loading members being rotatable about the common axis;
   feeding means for feeding a selected one of the plurality of disk-shaped recording media from a stored position to a feeding position, said feeding means including means for rotating a selected one of said loading members, corresponding to the selected disk-shaped recording medium, about the common axis through a predetermined angle to the feeding position, said means for rotating the selected one of said loading members including:
   a drive gear for engaging the geared portion of the selected one of said loading members when said loading means is inserted in the apparatus said drive gear being movable in the direction of the common axis;
   means for moving said drive gear in the direction of the common axis; and
   means for driving said drive gear to rotate said geared portion of the selected one of said loading members, so that the selected one of said loading members is moved to the feeding position; and
   lifting means for lifting the selected disk-shaped recording medium from the feeding position into a position at which the data recording or reproducing operation can be performed.

2. A device as set forth in claim 1, wherein each of said loading members comprises a swing plate having a recess which is shaped to hold one of the disk-shaped recording media, and wherein each of said swing plates has a notch extending from the periphery of the recess to substantially the center of the recess.

3. A device as set forth in claim 2, wherein said lifting means comprises:
   a lifter; and
   a clamp extending from said lifter, said clamp contacting and lifting the selected disk-shaped recording medium when said lifting means is actuated, said clamp and said lifter being shaped such that they can fit through the notch in the swing plate holding the selected disk-shaped recording medium.

4. A device as set forth in claim 2, wherein each of said loading members further includes a photoelectric switch, positioned in said recess, for detecting the presence or absence of one of the disk-shaped recording media within said recess.

5. A device as set forth in claim 1, wherein:
   said lifting means includes means for returning the selected disk-shaped recording medium to the feeding position after the data recording or reproducing operation has been performed for the selected disk-shaped recording medium; and
   said feeding means includes means for returning the selected disk-shaped recording medium to said loading means and for feeding a selected other one of the disk-shaped recording media to the feeding position.

6. A device as set forth in claim 5, wherein each of said loading members comprises a swing plate having a recess which is shaped to hold one of the disk-shaped recording media, and wherein each of said swing plates has a notch extending from the periphery of the recess to substantially the center of the recess.

7. A device as set forth in claim 6, wherein said lifting means comprises:
   a lifter; and
   a clamp extending from said lifter, said clamp contacting and lifting the selected disk-shaped recording medium when said lifting means is actuated, said clamp and said lifter being shaped such that they can fit through the notch in the swing plate holding the selected disk-shaped recording medium.

8. A device as set forth in claim 6, wherein each of said loading members further includes a photoelectric switch positioned in said recess, for detecting the presence or absence of one of the disk-shaped recording media within said recess.

9. A device for sequentially feeding a plurality of disk-shaped recording media in an apparatus for performing a data recording or reproducing operation on a rotating disk-shaped recording media, comprising:
   loading means for holding the plurality of disk-shaped recording media, said loading means being insertable into and removable from apparatus and including a plurality of loading members rotatable about a common axis, each of said loading members being capable of holding one of the disk-shaped recording media, each of said loading members comprising a swing plate having a recess which is shaped to hold one of the disk-shaped recording media, each of said loading members further including a photoelectric switch, positioned in said recess, for detecting the presence or absence of one of the disk-shaped recording media within said recess;
   feeding means for feeding a selected one of the plurality of disk-shaped recording media from a stored position to a feeding position and from the feeding position to the stored position;
   lifting means for lifting the selected disk-shaped recording medium from the feeding position into an operating position at which the data recording or reproducing operation can be performed, and for returning the selected disk-shaped recording medium to the feeding position the data recording or reproducing operation has been performed; and
   control means, coupled to said feeding means and to said lifting means, for determing the selected disk-shaped recording medium, for actuating said feeding means to feed the selected disk-shaped recording medium to the feeding position, for actuating said lifting means to lift the selected disk-shaped recording medium into the operating position and to return the selected disk-shaped recording medium to the feeding position after the data recording or reproducing operation has been performed, and for actuating said feeding means to return the selected disk-shaped recording medium to the stored position after said lifting means has returned the selected disk-shaped recording medium to the feeding position, said control means for actuating said feeding means and said lifting means to sequentially feed a plurality of disk-shaped recording media for the data recording or reproducing operation, said control means including:

first switch means, positioned at the stored position and the feeding position, for detecting, for each of the plurality of disk-shaped recording media, whether that medium is at the feeding position or the stored position, and for generating detection signals;

second switch means, positioned adjacent said lifting means, for determining whether said lifting means is at the feeding position or at the operation position and for generating detection signals; and a microprocessor, coupled to said first and second switch means, said feeding means and said lifting means, for receiving the detection signals output by said first and second switch means and for actuating said feeding means and said lifting means.

10. A device as set forth in claim 9, wherein said feeding means includes means for rotating a selected one of said loading members, corresponding to the selected disk-shaped recording medium, about the common axis through a predetermined angle to the feeding position.

11. A device as set forth in claim 10, wherein each of said swing plates has a notch extending from the periphery of the recess to substantially the center of the recess.

12. A device as set forth in claim 11, wherein said lifting means comprises:

a lifter; and a clamp extending from said lifter, said clamp contacting and lifting the selected disk-shaped recording medium once said lifting means is actuated, said clamp and said lifter being shaped such that they can fit through the notch in the swing plate holding the selected disk-shaped recording medium.

13. A device for sequentially feeding a plurality of disk-shaped digital recording media in an apparatus for performing a digital data recording or reproducing operation on a rotating disk-shaped digital recording medium, comprising:

loading means for holding a plurality of disk-shaped digital recording media, said loading means being insertable into and removable from the apparatus and including a plurality of loading members rotatable about a common axis, each of said loading being capable of holding one of the disk-shaped recording media, each of said loading members comprising a swing plate having a geared portion extending therefrom, said geared portions of said swing plates being rotatable about the common axis;

transport means for transporting a selected one of the plurality of disk-shaped digital recording media from a stored position to an operating position at which the data recording or reproducing operation can be performed, and for returning the selected disk-shaped digital recording medium to the stored position after the data recording or reproducing operation has been performed, said transport means including means for rotating a selected one of said swing plates, corresponding to the selected disk-shaped digital recording medium, about the common axis through a predetermined angle to the feeding position, said means for rotating the selected one of said swing plates including:

a drive gear engaging the geared portion of the selected one of said swing plates when said loading means is inserted in the apparatus, said drive gear being movable in the direction of the common axis;

means for moving said drive gear in the direction of the common axis; and means for driving said drive gear to rotate said geared portion of the selected one of said swing plates, so that the selected one of said swing plates is transported to the feeding position; and control means, coupled to said transport means, for determining the selected one of the plurality of disk-shaped digital recording media, for actuating said transport means to transport the selected disk-shaped recording medium to the operating position, and for actuating said transport means to transport the selected disk-shaped recording medium back to the stored position after the data recording or reproducing operation has been performed, said control means for actuating said transport means to sequentially feed at least two of the plurality of disk-shaped recording media to the operating position for the data recording or reproducing operation.

* * * * *

UNITED STATES PATENT AND TRADEMARK OFFICE
CERTIFICATE OF CORRECTION

PATENT NO. : 4,730,292
DATED : March 8, 1988
INVENTOR(S) : KAZUO HASEGAWA ET AL.

It is certified that error appears in the above-identified patent and that said Letters Patent is hereby corrected as shown below:

Column 4, line 43, "leyer" should be --lever--.

Column 7, line 12, after "from" insert --the--;
after "apparatus" insert --and--.

Column 8, line 35, after "from" insert --the--.
line 56, after "position" insert --after--.

[56] "Vischet" should be --Vischer--.

Signed and Sealed this

Fifth Day of July, 1988

Attest:

DONALD J. QUIGG

*Attesting Officer*    *Commissioner of Patents and Trademarks*